United States Patent Office 3,218,084
Patented Nov. 16, 1965

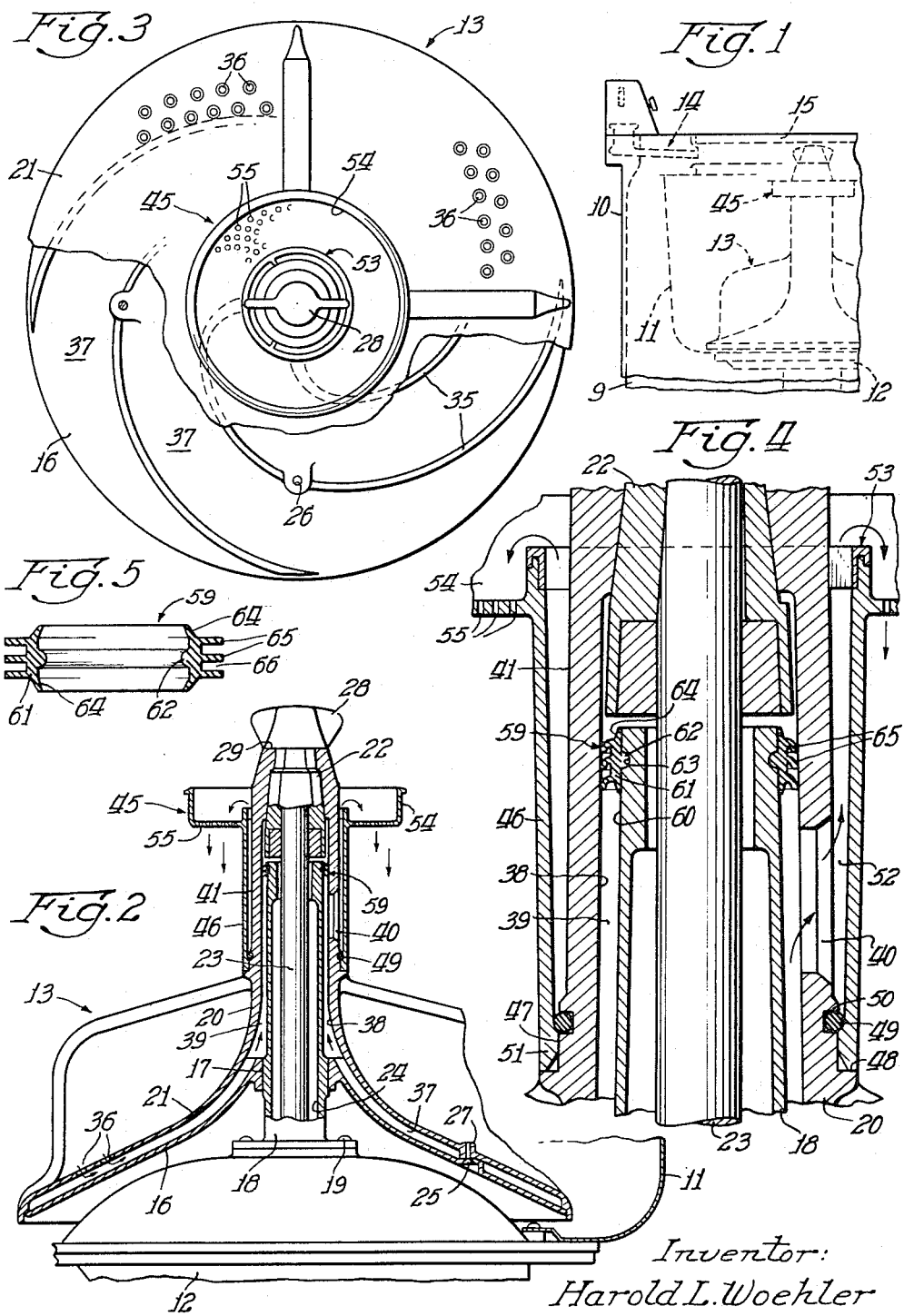

3,218,084
RELATIVELY ROTATABLE SHAFTS AND
FLUID SEAL ASSEMBLY
Harold L. Woehler, Herrin, Ill., assignor to Borg-Warner
Corporation, Chicago, Ill., a corporation of Illinois
Original application Aug. 21, 1961, Ser. No. 132,849.
Divided and this application June 1, 1964, Ser. No.
371,653
6 Claims. (Cl. 277—5)

This application is a division of my copending application, Serial No. 132,849, filed August 21, 1961.

This application relates to a sealing arrangement and more particularly to a flexible seal arrangement for preventing flow of a fluid between relatively rotatable concentric shafts.

In the operation of various apparatus, it is oftentimes desired that fluid be confined in, or moved through, a passage extending between two relatively rotatable substantially concentric shafts. However, it may be highly disadvantageous to have the fluid flow beyond the end of either one of the shafts because the fluid may enter a portion of the apparatus in which the fluid could cause serious damage. It is, therefore, extremely desirable to provide a structure for sealing the annular passage between two relatively rotatable concentric shafts to prevent flow of fluid beyond the end of either of the shafts and thereby confine the fluid to a desired channel to prevent damage to other parts of the apparatus.

It is an object of this invention to provide a sealing arrangement having a relatively simple and economical construction for sealing an annular space between concentric shafts wherein one of the shafts is rotated relative to the other shaft.

Another object of this invention is to provide a sealing arrangement for rotatable substantially concentric shafts wherein the sealing effect thereof is unaffected by wear caused by the rotation of one of the shafts relative to the other shaft.

A further object of this invention is to provide a sealing arrangement for rotatable substantially concentric shafts wherein the sealing effect thereof is unaffected by minor eccentricities between the shafts.

With these and other objects in view, the present invention contemplates a sealing arrangement for sealing an annular space between concentric shafts and includes a flexible body portion mounted on the inner shaft; sealing portions extending longitudinally and radially from the body; and flexible, annular, longitudinally spaced apart, sealing rings extending radially outward from the body to engage the outer shaft.

Other objects, advantages, and novel aspects of the invention will become apparent upon the following detailed description in conjunction with the accompanying drawings wherein:

FIG. 1 is a partial side view of a typical laundry machine embodying relatively rotatable shafts having the seal of the present invention provided therebetween;

FIG. 2 is a partial sectional view of the washing and filtering mechanism of the laundry machine and illustrating the relatively rotatable shafts, and the seal disposed therebetween.

FIG. 3 is a top view of the laundry machine mechanism shown in FIG. 2;

FIG. 4 is a partial sectional view of the mechanism shown in FIG. 3;

FIG. 5 is a sectional view of the seal showing the configuration thereof.

Referring to FIG. 1, as an example of an environment in which my invention is applicable, there is illustrated a washing machine of the type disclosed in Gerhardt Patent No. 2,807,951, filed October 1, 1957, which broadly includes a tub 9 in a casing 10, and a vertically disposed imperforate wash basket 11 within the tub and having a transmission casing 12 forming the bottom of the wash basket 11. An agitator generally designated by the numeral 13, is disposed within the wash basket 11 and is adapted to oscillate relative to the basket. Water is supplied to the basket 11 by a water supply means 14 and a hinged door 15 provides access to the basket 11.

The agitator 13 includes a conically shaped base plate 16 rotatably mounted on a surface 17 of a cylindrical center post 18 which is rigidly secured to the transmission casing 12 by screws 19. The agitator 13 also includes a cylindrical body portion 20 which terminates, at the bottom thereof, in a conical base portion 21. The agitator body 20 is splined to a hub 22 which in turn is rigidly secured to a shaft 23. The shaft 23 is positioned in the bore 24 of the center post and is driven by a transmission contained within the transmission casing 12.

The base portion 21 of the agitator body 20 is secured to the base plate 16 by a series of screws 25 inserted through an opening 26 (FIG. 3) in the base plate 16 and threadably attached to the base portion 21 at 27 (FIG. 2) of the agitator body 20. The base plate 16 and the agitator body 20 thereby form the agitator 13 which is rotatably supported on the surface 17 and by the driven hub 22. The agitator is held in position on the hub 22 and on the center post 18 by a wing nut 28 which is threadably attached to the shaft 23 and adapted to engage an upper surface 29 of the agitator 13 when tightened on the shaft 23.

The base plate 16 is provided with a series of spiral vanes 35 (FIG. 3) between the base plate 16 and the agitator base portion 21. The base portion 21 is provided with perforations 36 which allow the wash water to enter spaces 37 which are formed by the vanes 35. It should be noted that the agitator body 20 is provided with an inner bore 38 which is larger than the center post 18 so that a cylindrical passage 39 is provided between the center post 18 and the agitator body 20. The passage 39 opens into the spaces 37 between the base plate 16 and the base portion 21 of the agitator body 20. Also, the agitator body 20 is provided with a series of radially disposed openings 40 which interconnect the passage 39 and the outer surface 41 of the agitator body 20.

A lint filter screen unit, generally designated by the numeral 45, is provided for filtering the wash water and includes a cylindrical body 46 which is adapted to engage a cylindrical surface 47 and a shoulder 48 on the exterior of the agitator body 20. Between the filter screen unit and the agitator body 20 is a sealing ring 49 positioned in a groove 50 in the surface 47 of the agitator body 20. The sealing ring 49 is adapted to engage an inwardly extending annular projection 51, formed on the lower end of the lint screen body 46. The sealing ring 49 and projection 51 thereby tends to hold the filter screen 45 against upward longitudinal and rotational movement relative to the agitator body 20. It should be noted that the cylindrical surface 45 is large enough to position the lint screen body 46 on the agitator 13 so as to form a cylindrical passage 52 around the agitator 13.

An annular spacer 53 is provided between the upper portion of the agitator 13 and the upper end of the lint screen unit 45. The spacer 53 positions the upper end of the lint screen body 46 so as to maintain the passage 52 radially spaced from the agitator 13 at the top of the agitator. The spacer 53 is adapted to allow wash water to pass from the passage 52 through the spacer 53 and overflow (FIGS. 2 and 4) into a lint screen cup 54 which is formed on the lint screen body 46. The lint screen cup 54 is provided with perforations 55 to allow only the water to pass therethrough and to thereby filter out lint and other undesirable particles in the water.

The shaft sealing arrangement of the present invention is generally designated by the number 59 (FIGS. 2, 4, and 5). The seal 59 possesses particular utility in that it is specifically designed to seal a passage between two relatively rotating substantially concentric shafts. More particularly, in the laundry machine environment heretofore described, the seal 59 provides a seal for the cylindrical passage 39. The seal 59 is secured to an upper end of an outer surface 60 of the center post 18 and is disposed between the outer surface 60 and the inner surface 38 of the agitator body 20. The seal 59 is made of rubber or other resilient material and includes an annular body portion 61 provided with an inwardly extending annular projection or rib 62 which is adapted to seat in an annular groove 63 (FIG. 4) in the center post 18 to hold the seal 59 against movement longitudinally of the post.

The body portion 61 of the seal 59 is also provided with longitudinally extending annular end portions 64 which also normally extend slightly radially inward (FIG. 5) to create a fluidtight contact between the seal body 61 and the outer surface 60 of the center post 18. The body portion 61 is further provided with radially extending flanges 65 which are spaced apart a predetermined distance 66 to allow deformation of the flanges 65, as illustrated in FIG. 4, without engagement of the flanges with each other. It should be noted that the flanges 65 normally extend radially beyond the inner surface 38 of the agitator body 20 so that when the agitator body 20 is positioned over the center post 18, as illustrated in FIGS. 2 and 4, the flanges 65 will be deformed as indicated in FIGS. 2 and 4 to yieldingly engage the agitator body 20 to effectively provide a seal preventing passage of fluid through the channel 39, defined by the agitator body 20 and center post 18.

*Operation*

During the washing cycle, the shaft 23, connected to the transmission gearing, drives the hub 22 and agitator 13 in oscillatory motion. The wash water normally passes through the agitator perforations 36 and enters the spaces 37 between the base plate 16 and the base portion 21 of the agitator 13. As the agitator 13 is oscillated, the vanes 35 will cause the water to be forced upwardly between the base plate 16 and the agitator base portion 21 as indicated by the arrows (FIG. 2). The lint-laden water thus forced upwardly will pass through the cylindrical passage 39, through the series of openings 40 in the agitator body 20, into the cylindrical passage 52 and overflow into the lint screen cup 54 as indicated by the arrows (FIGS. 2 and 4).

The lint is filtered from the water by the perforations 55 in the lint cup 54 and the water will flow into the wash basket. As the water passes from the passage 39 to the series of radial openings 40, there will be a tendency for the water to continue to flow upwardly beyond the upper end of the center post 18, and if not prevented, the wash water would flow downwardly along the shaft 23 into the transmission casing 12 with resultant damage to the transmission.

The seal 59 prevents such damaging flow of wash water into the transmission casing 12 by preventing flow of wash water beyond the seal 59 and into the channel 20. More particularly, the resilient end portions 64 provide fluidtight contact between the seal body 61 and the outer surface 60 of the post 18. The flanges 65 are deformed by the inner surface 38 of the agitator to provide a fluidtight contact between the seal body 61 and the surface 38. It should be noted that as the seal wears, as a result of the rotational oscillatory motion of the agitator in relation to the stationary center post 18 during a washing operation, the deformed flanges 65 (FIGS. 2 and 4) will tend to straighten and extend to their normal radially extended position (FIG. 5) and thereby will maintain sealing engagement with the internal surface 38 of the agitator body 20 throughout the substantially long life of the flanges 65. Similarly, the flanges 65 will flex during rotation of the agitator 13 so as to compensate for any minor eccentricity between the agitator 13 and the center post surface 60.

It will be apparent that, if desired, the sealing arrangement can be modified so that the annular body 61 of the seal 59 could be provided with an outer circumferential rib received within an annular recess in the agitator body 20 and that spaced flanges may be formed on the inner circumference of the annular body of the seal to engage the post 18.

What is claimed is:

1. In combination, a pair of spaced substantially concentric shafts having adjacent substantially cylindrical surfaces defining a fluid passage therebetween, means for supporting said shafts for relative rotation about a common axis and preventing axial movement of said shafts during relative rotation thereof, a seal between said shafts and comprising an annular body member mounted on said adjacent surface of one of the shafts and having resilient annular flanges extending longitudinally and radially from said body member engaging the adjacent surface of one of said shafts to seal said shaft and said body against fluid flow therebetween, said body member also having a plurality of equally spaced flexible flanges of uniform diameter and having their opposing sides parallel, said flexible flanges extending radially from said body beyond said adjacent surface of said other shaft and being deformed by said adjacent surface of said other shaft for engaging the same to seal said passage between the shafts during relative rotation of said shaft.

2. In combination, a pair of spaced substantially concentric shafts having adjacent substantially cylindrical surfaces defining a fluid passage therebetween, means for supporting said shafts for relative rotation about a common axis and preventing axial movement of said shafts during relative rotation thereof, one of said surfaces having an annular groove formed therein, a seal between said shafts and comprising an annular body having a projection on its surface extending radially into the annular groove in said adjacent surface of the shaft to secure said body against longitudinal movement, said body having a plurality of flexible flanges extending radially from said annular body beyond said adjacent surface of the other shaft, said flanges being deformed by said adjacent surface of the other shaft for engaging the same to seal said passage between the shafts during relative rotation of said shafts, said flanges being of uniform diameter and longitudinally equally spaced on said body and having their opposing sides parallel for allowing unidirectional deformation of said flanges without engagement therebetween.

3. In combination, a pair of concentric shafts, means for supporting said shafts for relative rotation about a common axis and preventing axial movement of said shafts during relative rotation thereof, a seal between said shafts and comprising an annular body mounted on the exterior of the inner shaft and having resilient annular flanges extending longitudinally and radially inward for engaging the inner shaft to seal the inner shaft and the body against fluid flow therebetween, said body also having at least three equally spaced flexible flanges secured to the exterior of said body and of uniform diameter and having their opposing sides parallel, said flexible flanges normally extending radially beyond the inner surface of the outer shaft and being deformed by the inner surface of the outer shaft for engaging the inner surface of the outer shaft to seal said passage between said shafts during relative rotation of said shafts.

4. In combination, a stationary inner shaft having an annular groove therein, a rotatable concentric outer shaft in telescoping relation to said inner shaft and defining a fluid passage between said shaft, means for supporting said outer shaft for rotation relative to said inner shaft and preventing axial movement of said outer shaft relative to said inner shaft during rotation of said outer shaft, a seal between said shafts and comprising an annular body having a projection on the inner surface thereof extending into the annular groove in the inner shaft and said body against longitudinal movement, said body having resilient annular flanges extending longitudinally and radially inward for engaging the inner shaft to seal the seal the inner shaft and the body against fluid flow therebetween, said body also having a plurality of equally spaced flexible flanges secured to the exterior of said body and of uniform diameter and having their opposing sides parallel, said flexible flanges normally extending radially beyond the outer surface of the inner shaft and being deformed by the inner surface of the outer shaft for engaging the inner surface of the outer shaft to seal said passage between the shafts during rotation of said outer shaft relative to said inner shaft.

5. In combination, a pair of telescoping concentric shafts in spaced relation for defining a fluid passage therebetween, means for supporting said shafts in relative rotation about a common axis and preventing axial movement of said shafts during relative rotation thereof, a seal between said shafts and comprising an annular body mounted on the exterior of the inner shaft and having resilient anuular flanges extending longitudinally and radially inward for engaging the inner shaft to seal the inner shaft and the body against fluid flow therebetween during relative rotation of said shafts, said body also having flexible flanges secured to the exterior of said body and normally extending radially beyond the inner surface of the outer shaft and being deformed by the inner surface of the outer shaft for engaging the inner surface of the outer shaft to seal said passage between said shafts during relative rotation of said shafts, said flexible flanges being of uniform diameter and longitudinally and equidistantly spaced on said body and having their opposing sides parallel for allowing deformation of said flanges without engaging therebetween.

6. In combination, a stationary inner shaft having an annular groove therein, a rotatable concentric outer shaft spaced from said inner shaft and defining a fluid passage between said shafts, means for supporting said outer shaft for rotation relative to said inner shaft and preventing axial movement of said outer shaft relative to said inner shaft during rotation of said outer shaft, a seal between said shafts and comprising an annular body having a projection on the inner surface thereof extending into the annular groove in the inner shaft to secure said body against longitudinal movement, said body having resilient annular flanges extending longitudinally and radially inward for engaging the inner shaft to seal the inner shaft in the body against fluid flow therebetween, said body also having flexible flanges secured to the exterior thereof and normally extending radially beyond the inner surface of the outer shaft, said flexible flanges being deformed by the inner surface of the outer shaft for engaging the inner surface of the outer shaft to seal said passageway between said shaft during relative rotation of said shaft, said flexible flanges being longitudinally equidistantly spaced on said body and being of uniform diameter with their opposite sides parallel for allowing unidirectional deformation of said flanges without engagement therebetween.

References Cited by the Examiner

UNITED STATES PATENTS 2,512,847    6/1950    Conterman _____ 68—18
3,119,455    1/1964    Fuehrer et al. _____ 277—157

FOREIGN PATENTS 496,000    6/1950    Belgium.
435,152    9/1935    Great Britain.
550,312    1/1943    Great Britain.

LEWIS J. LENNY, *Primary Examiner.*
SAMUEL ROTHBERG, *Examiner.*